(12) United States Patent
Niijima

(10) Patent No.: US 6,325,936 B1
(45) Date of Patent: *Dec. 4, 2001

(54) PROCESS FOR TREATING WASTE WATER CONTAINING A RESIN

(75) Inventor: Toshio Niijima, Tokyo-To (JP)

(73) Assignee: Fuji Jukogyo Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/393,812

(22) Filed: Sep. 10, 1999

(30) Foreign Application Priority Data

Sep. 11, 1998 (JP) .................................. 10-258529

(51) Int. Cl.[7] ...................................................... C02F 1/56
(52) U.S. Cl. .......................... 210/626; 210/631; 210/705; 210/725; 210/727; 210/736; 210/908; 210/930; 210/734
(58) Field of Search ..................................... 210/725, 727, 210/728, 734, 735, 736, 908, 930, 626, 631, 705

(56) References Cited

U.S. PATENT DOCUMENTS

| | | | |
|---|---|---|---|
| 3,493,502 | * | 2/1970 | Coscia .................................. 210/736 |
| 3,846,293 | * | 11/1974 | Campbell ............................. 210/631 |
| 4,073,722 | * | 2/1978 | Grutsch et al. ......................... 210/5 |
| 4,173,532 | * | 11/1979 | Keoteklian ............................. 210/49 |
| 4,882,070 | * | 11/1989 | Wardell ................................ 210/727 |
| 4,933,087 | * | 6/1990 | Markham et al. ................... 210/626 |
| 4,948,513 | * | 8/1990 | Mitchell ............................... 210/727 |
| 5,084,186 | * | 1/1992 | Gilchrist .............................. 210/709 |
| 5,143,624 | * | 9/1992 | Morse .................................. 210/725 |
| 5,248,440 | * | 9/1993 | Mitchell et al. ..................... 210/712 |
| 5,433,853 | * | 7/1995 | Mamone ............................. 210/615 |
| 5,573,675 | * | 11/1996 | Sommese et al. .................. 210/705 |
| 5,647,996 | * | 7/1997 | Yablonsky et al. ................. 210/710 |

\* cited by examiner

Primary Examiner—Peter A. Hruskoci
(74) Attorney, Agent, or Firm—Smith, Gambrell & Russell, LLP

(57) ABSTRACT

A process for treating waste water containing a resin is disclosed, which includes the steps of adding a polyamine compound to waste water containing at least a resin to coagulate at least water-insoluble matter in the water to form coagulated particles, adding a polyacrylamide polymer to cause those particles to grow into flocculated flocs, and separating the flocculated flocs. The process of the invention can treat waste water containing a resin in an industrially beneficial way without producing a large amount of sludge is disclosed.

10 Claims, 2 Drawing Sheets

PROCESS FOR TREATING WASTE WATER CONTAINING A RESIN

BACKGROUND OF THE INVENTION

1. Field of the Invention

This invention relates to a process for treating waste water discharged during a painting process in a machine manufacturing factory (i.e., waste water containing a resin, pigment, etc.), or waste water discharged from various equipment in such a factory, containing organic matter and including the waste water mentioned above.

2. Description of the Related Art

Waste water containing organic matters is discharged in a large quantity from various equipment in a factory manufacturing machines, such as automobiles, (for example, waste water from a pit for circulating water from one painting booth to another, waste water produced by a shower test conducted to ascertain a tight seal on an assembly, waste water from a mess room and waste water from a water purifying tank). A painting plant, among others, discharges a large quantity of water circulating in a pit from one booth to another during a painting process, and such waste water contains a large amount of resins and pigments originating from a mist of paint. Waste water containing organic matter, such as a synthetic resin, has hitherto been treated for its separation by flocculation and flotation.

For treating such waste water, there has been employed a process which includes adding an inorganic flocculant, such as polyaluminum chloride, aluminum sulfate or ferrous chloride, to a waste liquid to cause it to undergo a flocculation, adding a polymeric flocculant, such as poly(meth)acrylamide or poly(meth)acrylic acid, to the flocculated waste liquid to form flocs (cotton-like flocculated masses), and separating them by flotation.

The above process using an inorganic flocculant has the drawback that the amount of the sludge produced by the treatment of waste water drastically increases as the amount used of the flocculant.

In order to overcome the above-described drawback, Japanese Patent Laid-Open No. 75703/1995, for example, describes a process which includes adding a silica type flocculant (a solution of blast furnace slag in dilute hydrochloric acid) to waste water containing an emulsion, etc. to grow a precipitate, and removing oily matter by flotation under pressure.

Japanese Patent Laid-Open No. 111407/1990 describes a process which includes adding a composition obtained by mixing a CaO—MgO—SiO$_2$ compound and a metal salt comprising an iron salt or a magnesium salt to a waste liquid containing an emulsion to flocculate resin particles in the liquid, and separating the flocculated particles.

Although these processes using inorganic flocculants have made it possible to reduce, as compared with the related art process, the amount of the sludge to be thrown away, its reduction is still unsatisfactory, and a further reduction thereof is desired. Moreover, the inorganic flocculants necessitate a complicated process for preparation, and are, therefore, too costly to be suitable for use on an industrial basis.

SUMMARY OF THE INVENTION

It is an object of this invention to provide a process which can treat waste water containing a resin in an industrially beneficial way without producing a large amount of sludge.

This invention resides in a process for treating waste water containing a resin which comprises the steps of adding a nitrogen compound to the waste water containing at least a resin to coagulate at least a water-insoluble matter in the waste water to form coagulated particles, adding an acrylamide polymer to cause the coagulated particles to grow into coagulated flocs, and separating the coagulated flocs (preferably by flotation).

DETAILED DESCRIPTION OF THE INVENTION

Figure 1:
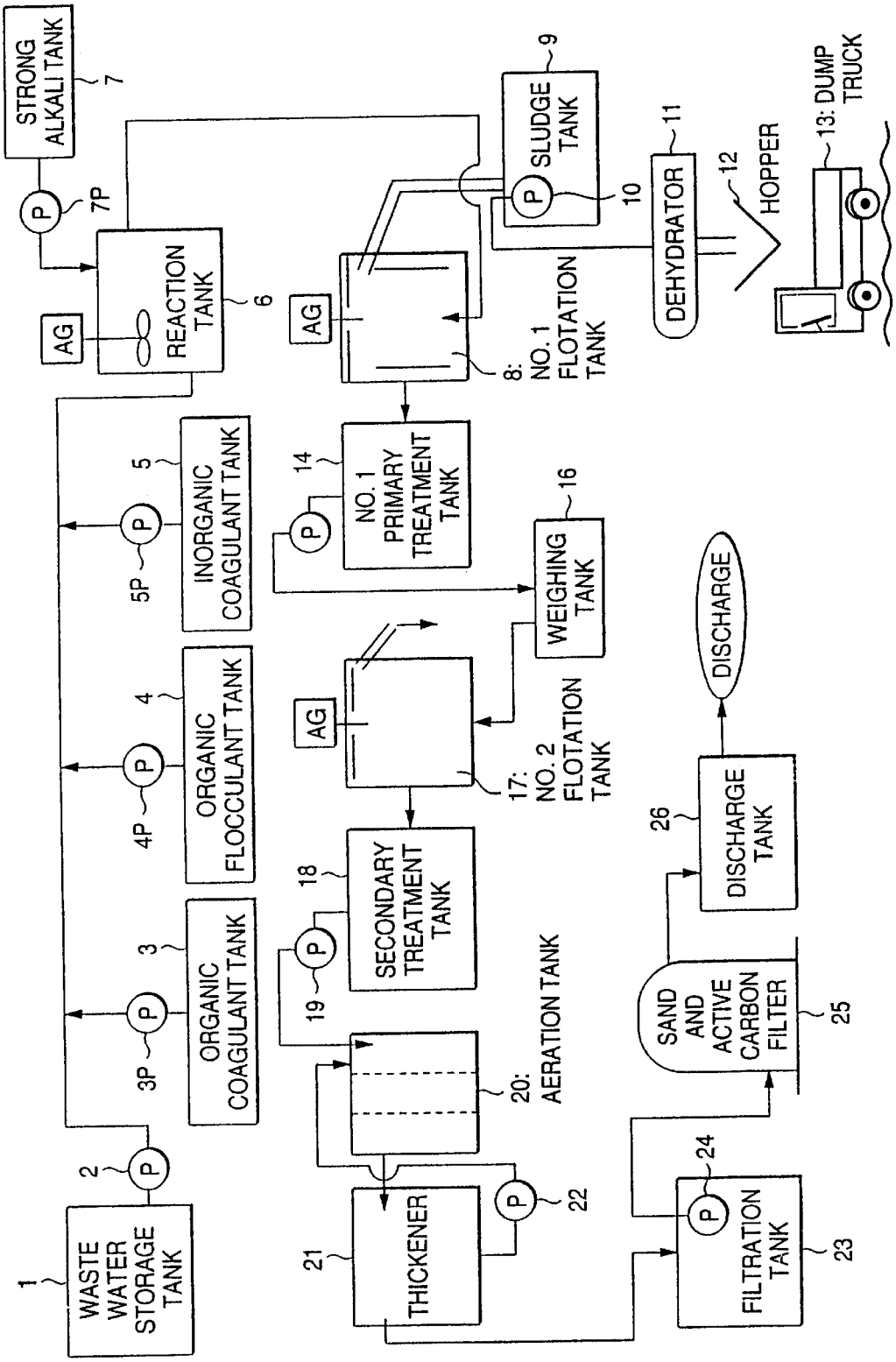
FIG. 1 is a flowchart showing a process for treatment according to this invention.

The process of this invention is applicable to waste water which is discharged from various factories and equipment and contains a resin, such as a synthetic resin and the like. For example, waste water discharged from various workshops or equipment in a factory manufacturing machines, such as automobiles and the like, is usually collected in one place for treatment, and includes waste water from a painting job, such as waste water from washing the material to be painted after surface degreasing, waste water from washing after undercoating by electrodeposition and waste water from a pit for circulating water from one booth to another, while other sources of waste water include a shower test for ascertaining a tight seal on an assembly, a mess room and a water purifying tank. The treatment of such waste water, therefore, requires a process which is effective for waste water containing a large amount of synthetic resin and pigment, as discharged from a painting process.

The treating process of this invention is suitable for the treatment of waste water containing organic matters as stated above and employs in combination specific kinds of organic coagulant and flocculant instead of the metal compounds or other inorganic flocculants which have hitherto been used, thereby enables a drastic reduction in the amount of the sludge (dehydrated) which is eventually formed.

The treating process of this invention can be carried out as will now be described by way of example with reference to FIG. 1.

Waste water discharged mainly from e.g. a painting shop and containing a synthetic resin, pigment, etc. is transferred into a waste water storage tank 1 and stored therein. When the water level reaches a fixed height in the tank, a pump 2 is started and the waste water moves to be conveyed into a reaction tank 6 (usually at a rate of 500 to 3,000 liters per minute). A pipeline between the pump 2 and the reaction tank 6 is provided with a feed opening of an organic coagulant tank 3 at a position a little close to the pump 2 from the middle point of the pipeline, a feed opening of an organic flocculant tank 5 on the reaction tank side of the immediately preceding feed opening.

The tank 3 stores a solution (usually 10 to 80%, and preferably 20 to 70%, by weight aqueous solution) containing a nitrogen compound as an organic coagulant. When the pump 2 is started, a pump 3P is started simultaneously and supplies the solution into the pipeline between the pump 2 and the reaction tank 6. The solution is usually introduced in the amount of from 0.001 to 0.1 liter (preferably from 0.002 to 0.05 liter) for 1,000 liters of the waste water.

The tank 4 stores a solution (usually 0.03 to 3%, and preferably 0.1 to 1%, by weight aqueous solution) containing a polyacrylamide polymer as an organic flocculant. When the pump 2 is started, a pump 4P is started simultaneously and supplies the solution into the pipeline between the pump 2 and the reaction tank 6. The waste water supplied in the pipeline already contains the organic coagulant. The solution is usually introduced in the amount of from 0.001 to 0.3 liter (preferably from 0.01 to 0.3 liter) for 1,000 liters of the waste water.

The tank 5 stores a solution (usually 3 to 30%, and preferably 5 to 15%, by weight solution) containing PAC (polyaluminum chloride) as an inorganic coagulant. When the pump 2 is started, a pump 5P is started simultaneously and supplies the solution into the pipeline between the pump 2 and the reaction tank 6. The waste water supplied in the pipeline already contains the organic coagulant and flocculant. The above-described solution is usually introduced in an amount not exceeding 50 liters for 1,000 liters of the waste water. Although the inorganic coagulant does not always have to be added, it is preferred to add it because, if it is not added, it is sometimes difficult to ensure the complete removal of foreign matters from the waste water.

The waste water, to which three kinds of agents have been added as stated above, is then introduced into the reaction tank 6. A strong alkali, such as caustic soda and the like, is automatically supplied from a strong alkali tank 7 through a pump 7P to adjust the pH of the waste water to a level of about 7. This pH level usually gives the maximum activity to the coagulant and flocculant.

Reference is now made to the manner in which the water-insoluble matters (and water-soluble foreign matters) in the waste water is flocculated to form flocculated flocs.

Figure 2:
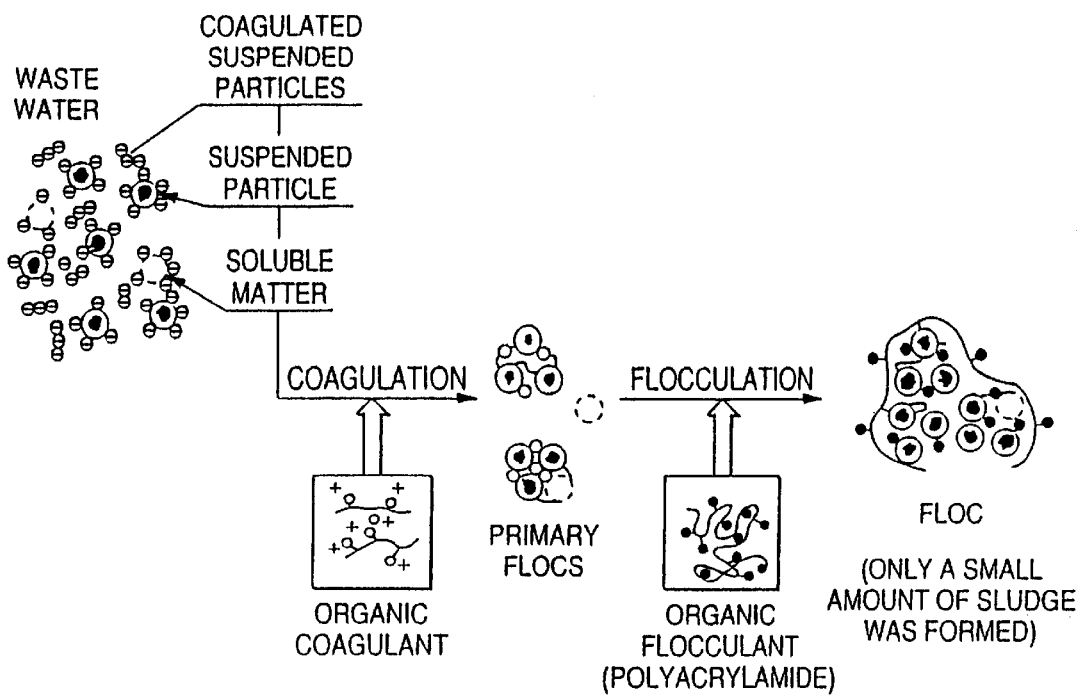
FIG. 2 shows one example of the structures of coagulated particles and flocculated flocs formed in waste water by adding the organic coagulant and flocculant according to this invention.

In the reaction tank in which the waste water and the above-described three kinds of agents are mixed, non-suspended particles (pigments and other floating substances: SS), suspended particles (synthetic resin, oil, etc.), soluble matters, etc. are united by the nitrogen compound to form coagulated particles (primary flocs) as shown in FIG. 2. It is considered due to the fact that the nitrogen compound has a positive charge, while those particles, etc. have a negative charge.

The above-described coagulated particles are flocculated by the action of the organic flocculant to grow into coagulated flocs. The above-described coagulated flocs have a structure as shown by way of example in FIG. 2. The flocculation occurs apparently owing to the fact that the coagulated particles shown in FIG. 2 have dominantly a positive charge, and, though the polyacrylamide polymer itself is neutral, the basicity of the nitrogen compound (amine, or ammonium salt) renders the amide group in the polymer anionic.

Figure 3:
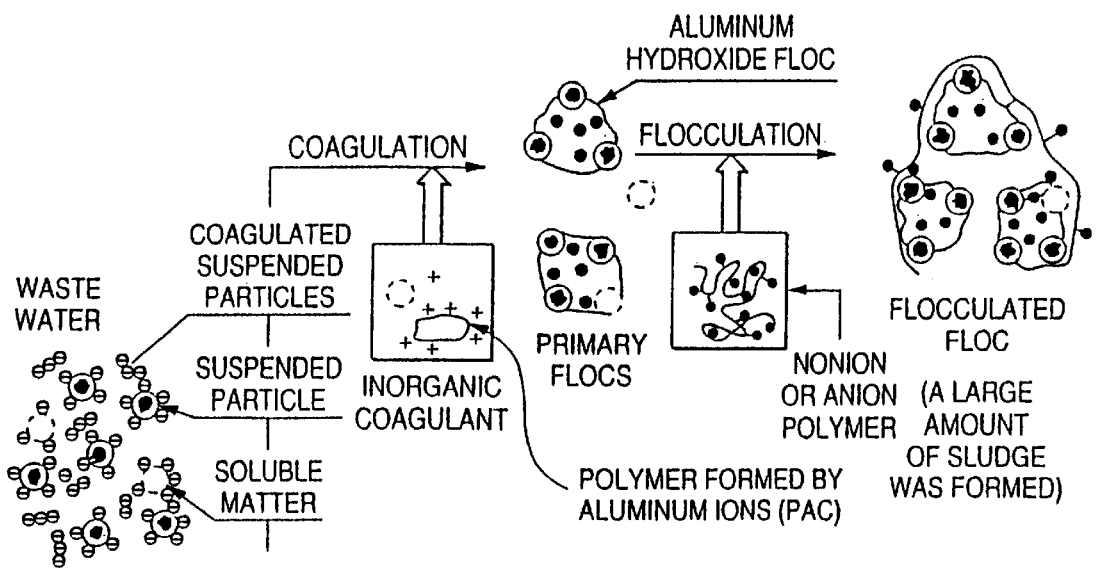
FIG. 3 shows one example of the structures of coagulated particles and flocculated flocs formed in waste water by adding the known organic coagulant and flocculant.

FIG. 3 shows the manner in which the coagulated flocs are formed when polyaluminum chloride is used as a known inorganic coagulant. As is obvious from this figure, primary flocs are so large that too large coagulated flocs are formed. The superiority of this invention is, thus, obvious.

The above-described coagulation and flocculation proceed in the reaction tank 6. The waste water usually stays in the reaction tank for one to 10 minutes. As a result, the waste water is divided into two phases, coagulated flocs and water.

The resulting coagulated flocs and water are transferred into No. 1 flotation-separation tank 8. Air is introduced into this separation flotation tank, so that large flocs may rise with the rising air and float on the surface of the liquid. The separation tank 8 has a scraper by which the floated flocs are discharged from the separation tank, and dropped into a sludge tank 9.

The flocs transferred into the sludge tank contain a considerably large amount of water and are dropped through a pump 10 into a dehydrator 11 below in which they are concentrated and dropped into a hopper 12. The dropped sludge in the hopper is carried by a dump truck 13, etc., and burned in an incinerator, etc.

The waste water (water) from which the flocs have been removed in No. 1 flotation-separation tank 8 is conveyed into a primary treatment tank 14. The water is, then, conveyed into a secondary treatment tank 18 if the removal of the flocs has been made well. If the removal of the flocs is bad, however, the water is conveyed through a weighing tank 16 into No. 2 flotation tank 17 in which it is subjected to flotation-separation treatment again. The resulting floated and scraped flocs are also dropped into the sludge tank 9.

Water is supplied from a purifying tank into the water in the primary treatment tank, or into the water treated in No. 2 flotation-separation tank, or if its BOD exceeds a specified value, industrial water is supplied, if desired.

The water conveyed into the secondary treatment tank 18 is conveyed through a pump 19 into an aeration tank 20. In the aeration tank, organic substances in the water are digested by an activated sludge. The water containing the activated sludge is conveyed by a pump 22 to a thickener 21 in which the activated sludge settles, and a transparent supernatant is transferred into a filtration tank 23. The water is conveyed by a pump 24 from the filtration tank into a sand filter and active carbon filter 25, and the water is conveyed into a discharge tank 26, from which it is finally discharged.

By the use of the above-described specific organic coagulant and flocculant according to this invention, it is sufficient to use only a small amount of flocculant (or coagulant) to form coagulated flocs, and as they can be separated by flotation, it is possible to reduce the amount of the sludge (which is received in the hopper), as compared with what is produced by any known process.

This invention is characterized by using the specific organic coagulant and flocculant to form coagulated flocs, and separating them by flotation, and in any other respect including a method of flotation, it can be carried out in any desired known way. For example, pressure, electrolytic, or oil separation can be employed as a method of flotation, in addition to the above-described foam separation. Moreover, the treatment can be carried out on a batch mode in each process in place of the continuous treatment as described above. The treatment is usually carried out at an ambient temperature, and if heat is generated, the treatment is discontinued, or the apparatus is cooled.

The above-described waste water containing, organic matters is the water containing (synthetic) resins, oils, dusts, and other organic substances (microorganisms, algae, etc.). They can visually be classified into liquid components, suspended substances, floating substances (SS), and a sediment. One liter of waste water may usually contain 10 to 1,000 mg (preferably 20 to 500 mg) of floating substances, and 10 to 500 mg (preferably 10 to 300 mg) of resins. The hexane extraction of waste water (corresponding to the oily contents) may range from 10 to 100 mg (preferably from 10 to 50 mg) per liter.

The polyamine compound used to form the above-described coagulated particles according to this invention is a compound having an amino group, or a quaternary ammonium salt, and preferably a quaternary ammonium salt. A condensation product of alkylamine and epichlorohydrin is, among others, preferred. A preferred epichlorohydrin condensation product is quaternary ammonium chloride represented by [—(Cl$^-$).N$^+$(—R)$_2$—CH$_2$—CH(OH)CH$_2$—]$_n$ (where n is a variable; the compound has a weight-average molecular weight of $2 \times 10^3$ to $3 \times 10^5$). The polyamine compound preferably has a weight-average molecular weight of from $2 \times 10^2$ to $3 \times 10^6$, and more preferably from $2 \times 10^3$ to $3 \times 10^5$. It is preferably added in an amount of 0.0002 to 0.005% by weight relative to waste water.

As the polyacrylamide polymer used to form the above-described flocs may usually be mentioned an acrylamide homopolymer, or a copolymer of acrylamide and other monomer (for example, alkyl (meth)acrylate, styrene, maleic anhydride or butadiene). Polyacrylamide is preferred. The polymer preferably has a weight-average molecular weight of from 100,000 to 100,000,000, and more preferably from 500,000 to 3,000,000. It is preferably added in an amount of 0.0002 to 0.02% by weight relative to waste water.

Although polyaluminum chloride has been mentioned as the inorganic flocculant, it is also possible to use any other known inorganic coagulant or flocculant.

The invention is described below in more detail with reference to the following Examples. However, it should not be construed that the invention is limited thereto.

EXAMPLE 1

The waste water treatment was carried out as described below by following the production line as shown in FIG. 1 (having a designed treating capacity of 160 m$^3$/h).

Waste water having the composition shown in Table 1 was introduced into the waste water storage tank 1. It was a collection of waste water discharged from various workshops and facilities in an automobile factory, including waste water after washing the material to be painted after surface degreasing, waste water from washing after e.g. undercoating by electrodeposition, waste water from a purifier, waste water from a pit for circulating water from one painting booth to another, water used for a shower test to ascertain a tight seal on an assembly, water from a press pit in a press shop, waste water from a mess room and waste water from a purifying tank. When the water level in the tank 1 had reached a fixed height, the pump 2 was started to convey the waste water into the reaction tank 6 at a rate of 1,800 liters per minute.

A 50% by weight aqueous solution of a polyamine compound, Zeta Ace C301 made by Kurita Industrial Co., Ltd., a condensation product of epichlorohydrin represented by [—(Cl$^-$).N+(—R)$_2$—CH$_2$—CH(OH)CH$_2$—]$_n$ (where n is a variable; the compound has a weight-average molecular weight of $2 \times 10^3$ to $3 \times 10^5$), was supplied as the organic coagulant at a rate of 0.01 liter per minute from the organic coagulant tank 3 into the pipeline between the pump 2 and the reaction tank 6 through the pump 3P. The pump 3P was started simultaneously with the pump 2.

A 0.33% by weight aqueous solution of a polyacrylamide polymer, EDP Floc 351 made by Kurita Industrial Co., Ltd., (a mixture containing 90% by weight of polyacrylamide polymer with bicarbonate, and organic and inorganic acids, and having a weight-average molecular weight of 14,000,000), was supplied as the organic flocculant at a rate of 2.4 liters per minute from the organic flocculant tank 4 into the pipeline between the pump 2 and the reaction tank 6 through the pump 4P. The pump 4P was started simultaneously with the pump 2.

An aqueous solution of PAC (polyaluminum chloride) (aqueous solution containing 10% by weight of PAC) was supplied as the inorganic coagulant at a rate of 0.025 liter per minute from the inorganic coagulant tank 5 into the pipeline between the pump 2 and the reaction tank 6 through the pump 5P. The pump 5P was started simultaneously with the pump 2.

The waste water to which the above-described three kinds of agents had been added was introduced into the reaction tank 6. Caustic soda was automatically supplied from the strong alkali tank 7 through the pump 7P to adjust the pH of the waste water to a level of about 7. Coagulated particles and flocculated flocs were formed in the reaction tank 6. The waste water stayed for five minutes in the flocculation tank. Thus, the waste water was divided into two components, flocculated flocs and water.

The resulting flocculated flocs and water were transferred into No. 1 flotation-separation tank 8, and air was introduced into the tank at a rate of 600 liters per minute to cause large flocs to rise and float on the liquid surface. The floated flocs were removed from the tank 8 by its scraper, and dropped into the sludge tank 9.

The flocs conveyed to the sludge tank and containing water were dropped into the dehydrator 11 through the pump 10, and concentrated, and the sludge was dropped into the hopper 12.

The water conveyed into the secondary treatment tank 18 after treatment in No. 2 flotation tank was conveyed by the pump 19 into the aeration tank 20, where the organic matters in the water was digested by an activated sludge. The water containing the activated sludge was transferred into the thickener 21, where the activated sludge was allowed to settle, and a transparent supernatant was conveyed into the filtration tank 23. The water in the filtration tank was filtered by the pump 24 through the sand filter and active carbon filter 25, and the water was transferred to and discharged through the discharge tank 26.

Data on the waste water and the water discharged are shown in Table 1 below, and data on the sludge in Table 2.

TABLE 1

| | pH | BOD (mg/L) | SS (mg/L) | n-hexane extraction (mg/L) | Resin (mg/L) | Clarity |
|---|---|---|---|---|---|---|
| Waste water | 6.7–7.7 | 200–400 | 50–200 | 20–100 | 30 | 2–5 |
| Discharged water | 7.1–7.8 | 10 or less | 20 or less | 5 or less | 9 or less | 50 or more |

The amount of the sludge which was formed was 102 kg per 100 m$^3$ of waste water.

Evaluation of waste water and discharged water:
(1) BOD (mg/l): Biochemical oxygen demand;
(2) SS (mg/l): Amount of floating suspended substances;
(3) Clarity (%): As determined in accordance with the JIS-K0102 method.

Comparative Example 1

The treatment of waste water was carried out without adding the organic coagulant solution, and by increasing the rate of supply of the aqueous solution of polyaluminum chloride from 0.025 liter per minute to 0.55 to 0.60 liter per minute and otherwise repeating Example 1. The results are shown below.

TABLE 2

| | pH | BOD (mg/L) | SS (mg/L) | n-hexane extraction (mg/L) | Resin (mg/L) | Clarity |
|---|---|---|---|---|---|---|
| Waste water | 6.7–7.7 | 200–400 | 50–200 | 20–100 | 30 | 2–5 |
| Discharged water | 7.1–7.8 | 10 or less | 20 or less | 5 or less | 1.2 | 50 or more |

The amount of the sludge which was formed was 183 kg per 100 m$^3$ of waste water.

This invention is a process which facilitates the treatment of waste water containing waste water discharged from a painting shop, etc. (i.e., water containing a resin, pigment, etc.), and which employs specific kinds of organic coagulant and flocculant instead of the metal compounds, or other inorganic flocculants as hitherto used, and thereby enables a drastic reduction in the amount of the sludge (dehydrated) which is eventually formed.

While the presently preferred embodiments of the present invention have been shown and described, it is to be understood that the disclosure is for the purpose of illustration and that various changes and modifications may be made without departing from the scope of the invention as set forth in the appended claims.

What is claimed is:

1. A process for treating a wastewater containing a resin comprising:
    adding an organic coagulant, containing an amine or quaternary annonium salt, into said waste water so as to coagulate said resin;
    mixing a polyacrylamide flocculant into said waste water so as to cause flocculation;
    adding an inorganic coagulant into said waste water so as to form coagulated flocs;
    separating said flocs from said waste water by flotation;
    digesting organic substances with activated sludge in said waste water;
    settling down said organic substances; and
    filtering said waste water.

2. The process according to claim 1, wherein said waste water contains 10 to 500 mg of a resin component per liter.

3. The process according to claim 1, wherein said organic coagulant is an additive of a polyamine of 0.0002 to 0.0005% by weight of said waste water.

4. The process according to claim 1, wherein said flocculant is an amount of a polymer of 0.0002 to 0.02% by weight of said waste water.

5. The process according to claim 1, wherein said inorganic coagulant is polyaluminum chloride.

6. A process for treating a wastewater containing a resin comprising:
    adding an organic coagulant including a polyamine compound having a condensation product of alkylamine and epichlorohydrin to said waste water for forming coagulated particles by coagulating at least water insoluble matter included in said waste water;
    adding an organic flocculant including polyacrylamide polymer for growing said coagulated particles into flocculated flocs;
    adding an inorganic coagulant to thereby coagulate particles contained therein;
    storing said waste water with adding an alkaline for adjusting a pH value of said waste water in order to give a maximum activity to the coagulants and flocculant;
    separating said flocculated flocs from said waste water by flotation;
    digesting organic substances with activated sludge in said waste water;
    settling down said organic substances; and
    filtering said waste water.

7. The process according to claim 6, wherein said waste water contains 10 to 500 mg of a resin component per liter.

8. The process according to claim 6, wherein said organic coagulant is an additive of a polyamine of 0.0002 to 0.0005% by weight of said waste water.

9. The process according to claim 6, wherein said organic flocculant is an amount of a polymer of 0.0002 to 0.02% by weight of said waste water.

10. The process according to claim 6, wherein said inorganic coagulant is polyaluminum chloride.

* * * * *